(12) United States Patent
Kim

(10) Patent No.: US 10,509,095 B1
(45) Date of Patent: Dec. 17, 2019

(54) SYSTEM AND METHOD FOR SHARING LOCATION OF VEHICLE

(71) Applicants: HYUNDAI MOTOR COMPANY, Seoul (KR); KIA MOTORS CORPORATION, Seoul (KR)

(72) Inventor: Dong Jin Kim, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/377,635

(22) Filed: Apr. 8, 2019

(30) Foreign Application Priority Data

Oct. 24, 2018 (KR) .......................... 10-2018-0127558

(51) Int. Cl.
*H04W 24/00* (2009.01)
*G01S 5/00* (2006.01)
*G07C 5/00* (2006.01)
*H04W 8/24* (2009.01)
*H04W 4/029* (2018.01)
*H04W 64/00* (2009.01)
*H04W 4/40* (2018.01)

(52) U.S. Cl.
CPC ............ *G01S 5/0027* (2013.01); *G07C 5/008* (2013.01); *H04W 4/029* (2018.02); *H04W 4/40* (2018.02); *H04W 8/24* (2013.01); *H04W 64/003* (2013.01)

(58) Field of Classification Search
CPC ................... H04W 4/02; H04W 4/029
See application file for complete search history.

(56) References Cited

U.S. PATENT DOCUMENTS

| | | | | |
|---|---|---|---|---|
| 2005/0136942 A1* | 6/2005 | Timiri | ................ | H04W 4/029 455/456.1 |
| 2006/0129691 A1* | 6/2006 | Coffee | ................ | H04L 67/04 709/230 |
| 2014/0012492 A1* | 1/2014 | Bowers | ................ | G08G 1/16 701/301 |
| 2015/0079932 A1* | 3/2015 | Zelinka | ................ | H04W 4/029 455/411 |
| 2018/0018635 A1* | 1/2018 | Suzuki | ................ | H04W 4/029 |
| 2019/0176752 A1* | 6/2019 | Cermak | ................ | B60R 25/01 |

* cited by examiner

*Primary Examiner* — Shantell L Heiber
(74) *Attorney, Agent, or Firm* — Morgan, Lewis & Bockius LLP

(57) ABSTRACT

A location sharing system of a vehicle includes: a vehicle device configured to monitor and provide location information and state information of the vehicle; a plurality of service nodes configured to provide a location-based service based on the location information of the vehicle; and a location sharing server configured to set a first sharing period of time and a target service node for providing a location sharing service between the vehicle device and the plurality of service nodes and to transmit the location information of the vehicle to the target service node during the first sharing period of time. The location sharing server determines a remaining period of time in the first sharing period of time to restart the location sharing service between the vehicle device and the target service node depending on a determination result.

20 Claims, 12 Drawing Sheets

SYSTEM AND METHOD FOR SHARING LOCATION OF VEHICLE

CROSS-REFERENCE TO RELATED APPLICATION

This application is claims the benefit of priority to Korean Patent Application No. 10-2018-0127558, filed in the Korean Intellectual Property Office on Oct. 24, 2018, the entire contents of which are incorporated herein by reference.

TECHNICAL FIELD

The present disclosure relates to a location sharing system of a vehicle and a method to thereof.

BACKGROUND

The audio, video, navigation (AVN) system of a vehicle verifies the real-time location of a vehicle and provides a driver with various pieces of information based on the verified location.

With the development of technology, information of a vehicle has been recently shared with an electronic device by providing the information of the vehicle through communication between the vehicle and the electronic device.

However, settings may be initialized in the system when the ignition of the vehicle is turned off, and thus, a user needs to set the vehicle when the vehicle restarts.

Accordingly, the user convenience may be deteriorated, and the continuity of shared information may not be maintained.

SUMMARY

The present disclosure has been made to solve the above-mentioned problems occurring in the prior art while advantages achieved by the prior art are maintained intact.

An aspect of the present disclosure provides a location sharing system of a vehicle that maintains location sharing setting information between a vehicle device and a target service node at the time of restart after the ignition is turned off and provides a continuous location sharing service, and a method thereof.

Another aspect of the present disclosure provides a location sharing system of a vehicle that provides a continuous location sharing service by extending the sharing time when the set location sharing time has elapsed while the vehicle is driving, and a method thereof.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a location sharing system of a vehicle includes: a vehicle device configured to monitor and provide location information and state information of the vehicle; a plurality of service nodes configured to provide a location-based service based on the location information of the vehicle; and a location sharing server configured to set a first sharing period of time and a target service node for providing a location sharing service between the vehicle device and the plurality of service nodes, to transmit the location information of the vehicle to the target service node during the first sharing period of time, and to determine a remaining period of time in the first period of time for restarting the location sharing service between the vehicle device and the target service node depending on a determination result of the remaining period of time, when a switch from an ignition off state of the vehicle to an ignition on state of the vehicle is determined based on the vehicle state information.

The location sharing server may be configured to verify remaining time of the set sharing time to restart the location sharing service between the vehicle device and the target service node depending on the verification result, when a switch from an ignition off state of the vehicle to an ignition on state of the vehicle is verified based on the state information of the vehicle.

The vehicle device may be configured to transmit the location information of the vehicle to the location sharing server depending on a driving state of the vehicle in real time or for each period, when the location sharing service is activated upon turning on an ignition of the vehicle.

The vehicle device may be configured to transmit the location information of the vehicle to the location sharing server, when it is determined that navigation information of the vehicle is changed by monitoring the navigation information of the vehicle.

The vehicle device may be configured to transmit the changed state information of the vehicle and the location information of the vehicle to the location sharing server, when it is determined that the state information of the vehicle is changed by monitoring the state information of the vehicle.

The location sharing server may be configured to restart the location sharing service between the vehicle device and the target service node, when the remaining time of the set sharing time has left.

The location sharing server may be configured to determine whether a current location of the vehicle corresponds to a final destination to determine restart of the location sharing service depending on the determination result, when the remaining time of the set sharing time has not left.

The location sharing server may be configured to set the sharing time of the location sharing service again to restart the location sharing service based on the sharing time set again, when the current location of the vehicle does not correspond to the final destination.

The location sharing server may be configured to terminate the location sharing service, when the current location of the vehicle corresponds to the final destination.

The location sharing server may be configured to determine whether to extend the sharing time, through the vehicle device, when the remaining time of the set sharing time is not greater than a predetermined reference time.

The location sharing server may be configured to extend the sharing time of the location sharing service provided to the target service node to provide the location sharing service based on the extended sharing time, when a request for an extension of the sharing time is received from the vehicle device.

The vehicle device may be configured to make the request for the extension of the sharing time of all or part of the target service node.

The vehicle device may be configured to transmit identification information of a recipient and location sharing condition information to the location sharing server to make a to request for a registration of the location sharing service.

The identification information of the recipient may include at least one or more of vehicle identification number (VIN) of the vehicle device, universal subscriber identity module (USIM) information, a terminal modem serial number, an ID and a password of a user, a telephone number, and a security code arbitrarily generated in advance by the location sharing server.

The location sharing condition information may include at least a piece or pieces of information of the target service node for providing the location sharing service, a sharing target item, and share permission.

The location sharing server may be configured to identify the recipient based on the identification information of the recipient to authenticate the identified recipient.

The location sharing server may be configured to set a sharing condition of the location sharing service based on the location sharing condition information, when the authentication of the recipient is completed.

The location sharing server may be configured to verify a time required to arrive at a destination from destination information to set the sharing time depending on the verified time required to arrive at the destination, when the destination information is included in the location information of the vehicle.

According to another aspect of the present disclosure, a location sharing method of a vehicle includes steps of: setting, by a location sharing server, a first sharing period of time and a target service node for providing a location sharing service between a vehicle device configured to monitor and provide location information and state information of the vehicle and a plurality of service nodes configured to provide a location-based service based on the location information of the vehicle to transmit the location information of the vehicle to the target service node during the first sharing period of time, verifying, by the location sharing server, a remaining period of time in the first sharing period of time, when a switch from an ignition off state of the vehicle to an ignition on state of the vehicle is verified based on the state information of the vehicle, and restarting the location sharing service between the vehicle device and the target service node, when the remaining time exists.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
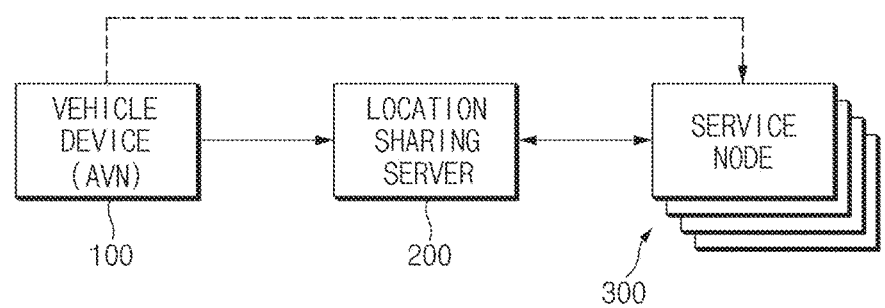
FIG. 1 is a block diagram illustrating a configuration of a location sharing system of a vehicle, according to an embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known features or functions will be ruled out in order not to unnecessarily obscure the gist of the present disclosure.

In describing elements of exemplary embodiments of the present disclosure, the terms first, second, A, B, (a), (b), and the like may be used herein. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which this invention belongs. It will be understood that terms used herein should be interpreted as having a meaning that is consistent with their meaning in the context of the present disclosure and the relevant art and will not be interpreted in an idealized or overly formal sense unless expressly so defined herein.

FIG. 1 is a block diagram illustrating a configuration of a location sharing system of a vehicle, according to an embodiment of the present disclosure.

Referring to FIG. 1, a location sharing system of a vehicle may include a vehicle device 100, location sharing server 200, and a plurality of service nodes 300.

The vehicle device 100 can make a request for the registration of a location sharing service of the at least one or more service nodes 300 and provide the location sharing server 200 with state information and/or location information of the vehicle, when the location sharing service is activated. Moreover, the vehicle device 100 may restart the corresponding location sharing service by verifying the remaining time of the sharing time set for the location sharing service between the vehicle device 100 and the target service node 300, when the ignition of the vehicle device 100 is turned off in a state where the location sharing service is activated and then the vehicle device 100 can restart within a predetermined time.

Herein, the vehicle device 100 may operate as an audio, video, navigation (AVN) system.

Figure 2:
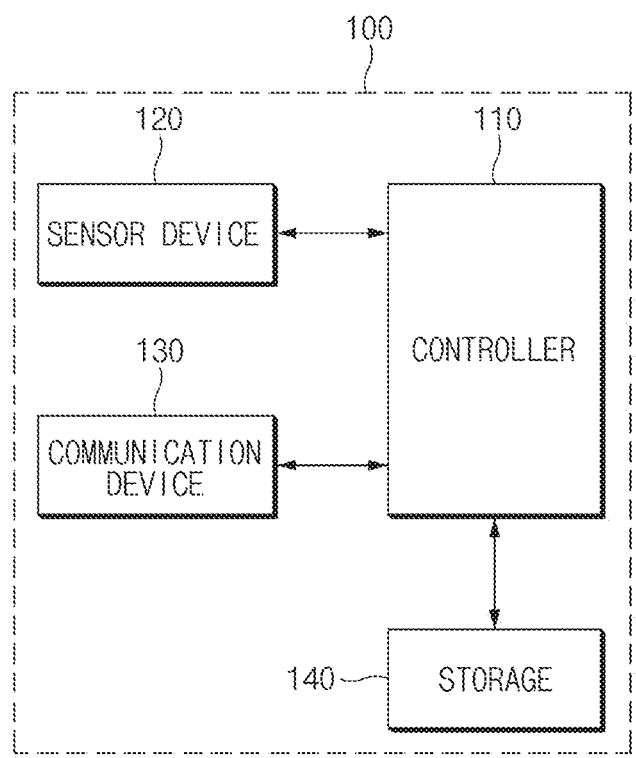
FIG. 2 is a block diagram illustrating a configuration of a vehicle device, according to an embodiment of the present disclosure.

The detailed configuration of the vehicle device 100 is described with reference to FIG. 2. Referring to FIG. 2, the vehicle device 100 may include a controller 110, a sensor device 120, a communication device 130, and storage 140.

The sensor device 120 may include one or more sensors that collect state information of a vehicle.

For example, the sensor device 120 may include a sensor that collects setting information such as the on/off state, specification, temperature, intensity, and operation mode of an air conditioning system. The sensor device 120 may further include a sensor that collects on/off state information of an engine. In addition, the sensor device 120 may further include a sensor that collects information such as a transmission type (manual transmission, automatic transmission, and dual clutch transmission) and gear stages (stage P, stage R, stage N, and stage D) of the transmission. The sensor device 120 may further include a sensor that collects information such as a lock/unlock state of a door, an open/close state of a door, an open/close state of a hood, an open/close state of a window, an open/close state of a sunroof, and the like. Furthermore, the sensor device 120 may include a sensor for collecting heat line state information in a steering wheel, a rear window and/or the seat of the vehicle. Moreover, the sensor device 120 may include to a sensor for collecting information such as a charged state of a battery, a charged amount, a time required to charging, a distance within which the vehicle is capable of driving, and the like. In addition, the sensor device 120 may further include a sensor for collecting information such as a remaining fuel amount of the vehicle and a distance within which the vehicle is capable of driving, according to the remaining fuel amount.

The sensor device 120 may include one or more sensors for collecting location information of the vehicle. For example, the sensor device 120 may include a sensor for collecting current location information such as vehicle's coordinates (GPS), a vehicle address, road information, vehicle traveling direction (compass/gyro), a vehicle speed, current time, or the like. Furthermore, the sensor device 120 may further include a sensor for collecting information such as name, coordinates, address, a remaining movement time, a remaining movement distance, or the like of the destination.

In a state where the vehicle's location sharing service is activated, the sensor device 120 collects the state information and/or location information of the vehicle in real time or at a specified period, and transmits the collected information to the controller 110.

The communication device 130 may include a communication module that supports a communication interface with automotive components and/or control units included in the vehicle. For example, the communication module may communicate with the sensors mounted in the vehicle and may receive the information collected by the sensors. The communication module may include a module that supports vehicle network communication such as Controller Area Network (CAN) communication, Local Interconnect Network (LIN) communication, Flex-Ray communication, or the like.

Furthermore, the communication device 130 may include a communication module that supports a communication interface with the location sharing server 200. For example, the communication module may include a module for wireless Internet access or a module for short to range communication. The wireless Internet technology may include a wireless LAN (WLAN), a Wireless Broadband (Wibro), a Wi-Fi, a World Interoperability for Microwave Access (Wimax), and the like, and the short range communication technology may include Bluetooth, ZigBee, Ultra Wideband (UWB), Radio Frequency Identification (RFID), Infrared Communication Infrared Data Association (IrDA), and the like.

The storage 140 may store data and/or an algorithm required to operate the vehicle device 100. For example, the storage 140 may store activation state information and/or setting condition information of a location sharing service and may store a command and/or an algorithm for performing the location sharing service. In addition, the storage 140 may store information collected by the sensors, and may store an algorithm for determining the changed state of the collected information.

Herein, the storage 140 may include a storage medium such as a Random Access Memory (RAM), a Static Random Access Memory (SRAM), a Read-Only Memory (ROM), a Programmable Read-Only Memory (PROM), or an Electrically Erasable Programmable Read-Only Memory (EEPROM).

The controller 110 may set the activation or deactivation state of the location sharing service at the request of a user. Furthermore, the controller 110 may transmit the state information and/or location information of the vehicle collected by the sensor device 120, to the location sharing server 200 via the communication device at the time of activation of the location sharing service. In this case, the controller 110 may transmit state information and/or location information of a vehicle together with identification information of a recipient who receive the sharing.

Herein, the identification information of the recipient may mean authentication information for security communication between the target service node 300 and the location sharing server 200.

For example, the identification information of the recipient may include at least one or more of unique information of the vehicle terminal (e.g., vehicle identification number (VIN), universal subscriber identity module (USIM) information, a terminal modem serial number, or the like), the ID and password of the user, the telephone number, and the security code arbitrarily generated in advance by the location sharing server 200.

The controller 110 may transmit location sharing condition information for the sharing state information and/or location information of the vehicle, together. For example, the controller 110 may transmit information such as a target service node, a sharing target item, and/or share permission for providing the location sharing service.

The controller 110 may request the location sharing service to be deactivated while transmitting the vehicle state information to a location information server, when the ignition of the vehicle is switched to the off state in the active state of the location sharing service. The controller 110 may continuously share the state information and/or location information of the vehicle while maintaining the setting information of the location sharing service previously provided by the location sharing server 200, when the vehicle is restarted within a predetermined time after the ignition of the vehicle is turned off.

Moreover, the controller 110 may deactivate the location sharing service when the set location sharing time has elapsed while the controller 110 shares state information and/or location information of the vehicle. However, after authenticating the recipient, the controller 110 may extend the location sharing time at the request of the user. In this case, the controller 110 may make a request for a sharing time extension to the location sharing server 200 together with the identification information of the recipient who will extend the location sharing time.

The controller 110 may determine whether the location sharing time is extended at the request of the location sharing server 200 and may provide the determination result to the location sharing server 200.

The vehicle device 100 according to the present embodiment operating as described above may be implemented in the form of an independent hardware device including a memory and a processor for processing each operation and may be driven in the form included in other hardware devices such as a microprocessor or a general purpose computer system.

The location sharing server 200 registers the target service node 300, which will share the state information and/or location information of the vehicle provided from the vehicle device 100, and provides the target service node 300 with information provided from the vehicle device 100 in real time.

At this time, the location sharing server 200 authenticates the recipient based on the identification information of the recipient provided from the vehicle device 100 and provides the corresponding service node 300 with shared information at the time of authentication completion.

Herein, the location sharing server 200 may provide a service based on a location sharing platform.

Figure 3:
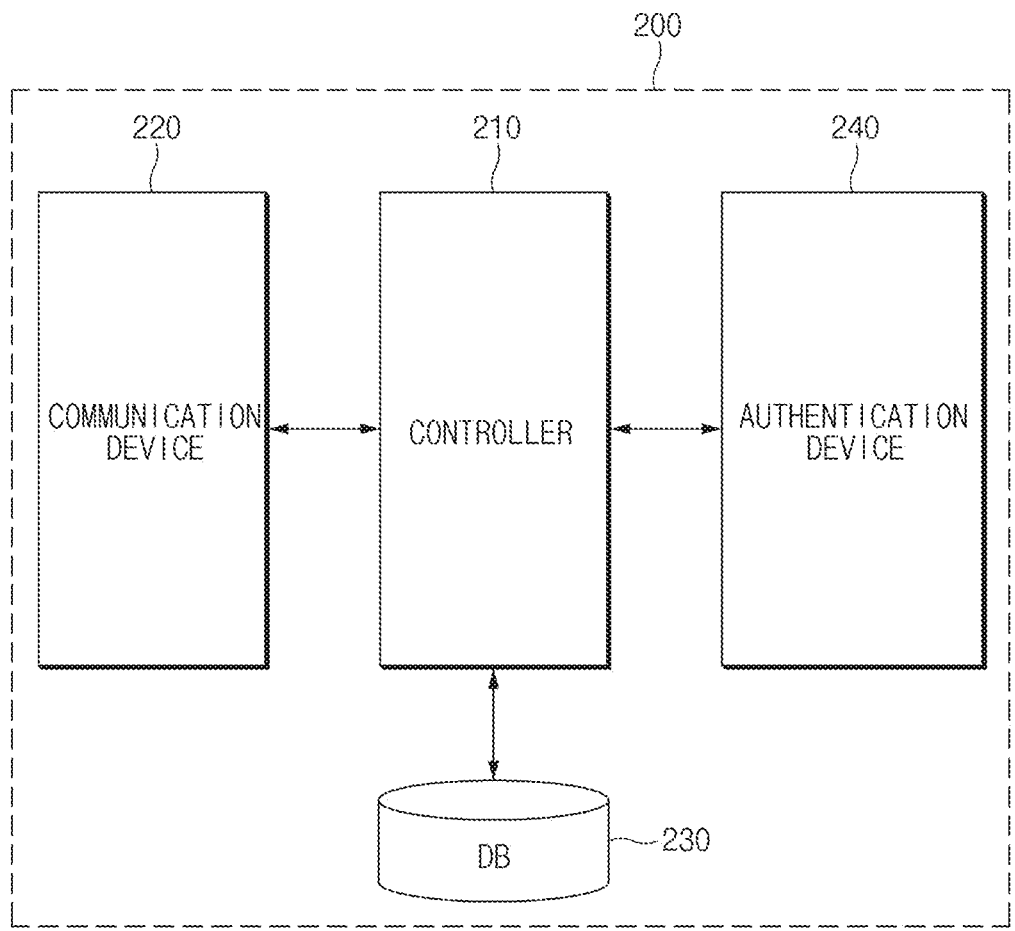
FIG. 3 is a block diagram illustrating a configuration of a location sharing server, according to an embodiment of the present disclosure.

As such, the detailed configuration of the location sharing server 200 is described with reference to FIG. 3. Referring to FIG. 3, the location sharing server 200 may include a controller 210, a communication device 220, a DB 230, and an authentication device 240.

The controller 210 registers or releases the location sharing service at the request of the vehicle device 100 and provides the registered target service node 300 with state information and/or location information of the vehicle provided from the vehicle device 100.

The communication device 220 includes a communication module that supports a communication interface with the vehicle device 100. Moreover, the communication device 220 may further include a communication module that supports a communication interface with the service node 300.

At this time, the communication module may include a module for wireless Internet access or a module for short range communication. Herein, the wireless Internet technology may include a MILAN, a Wibro, a Wi-Fi, a Wimax, or the like; the short range communication technology may include Bluetooth, ZigBee, UWB, RFID, IrDA, and the like.

The DB 230 may store the information of the recipient registered in the location sharing service, and may store the target service node, location sharing setting condition, or the like of the registered location sharing service. Moreover, the DB 230 may store state information and/or location information of the vehicle provided by the vehicle device 100. Herein, the DB 230 is may include storage media such as RAM, SRAM, ROM, PROM, EEPROM, and the like.

The DB 230 provides the authentication device 240 with the identification information of the recipient, when a request for registering a location sharing service is received from the vehicle device 100. At this time, the authentication device 240 may identify the recipient based on the identification information received from the vehicle device 100 and may authenticate the identified recipient.

The authentication device 240 may perform authentication after the procedure of registering the corresponding user is completed, when the recipient requiring the registration of the location sharing service is not a pre-registered user.

Figure 4:
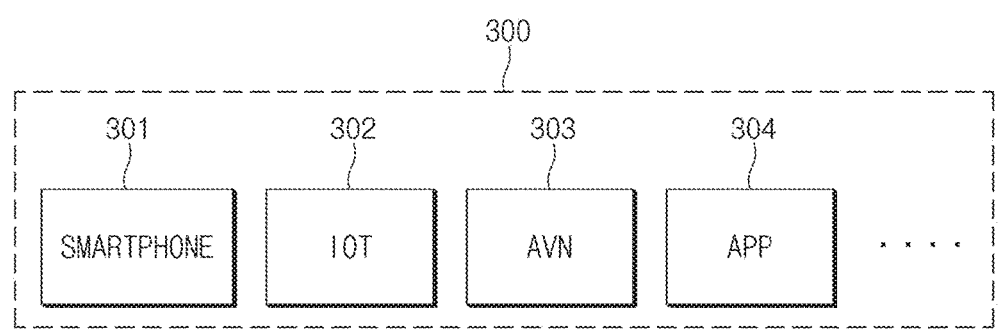
FIG. 4 is a block diagram illustrating an embodiment of a service node, according to an embodiment of the present disclosure.

The controller 210 sets a location sharing condition depending on the location sharing setting condition received from the vehicle device 100 and determines a target service node, which will provide the location sharing service, from among the registered service nodes 300, when the authentication of the recipient is completed. Herein, as illustrated in FIG. 4, the service node 300 may correspond to a smartphone 301, an Internet of Things (IOT)-based electronic device 302, an audio, video, navigation (AVN) system 303, and an application (APP) 304 installed in a communication terminal, or the like. In addition, the service node 300 is capable of being applied, when the service node 300 is any device and/or system capable of providing services based on the location of the vehicle.

The controller 210 may provide the target service node 300 with state information and/or location information of the vehicle provided from the vehicle device 100, depending on the to set location sharing condition.

Herein, the controller 210 may set a server-based location sharing time. Here, the controller 210 may verify a time required to arrive at the destination and may set the sharing time by reflecting the verified time required to arrive at the destination, when the destination information is provided from the vehicle device 100. The controller 210 may set the sharing time to a default value, when the destination information is not provided.

At this time, the controller 210 allows the location sharing service to be maintained for the set sharing time.

The controller 210 verifies the state information and/or location information of the vehicle in real time while the location sharing service is provided.

The controller 210 verifies the remaining time of the sharing time set for the location sharing service between the vehicle device 100 and the target service node 300, when the state of the vehicle is switched to the ignition off state and then is switched to an ignition on state. The controller 210 may restart the location sharing service while maintaining recipient setting information and location sharing setting information of the location sharing service as it is, when the remaining time remains.

In the meantime, the controller 210 may set the sharing time of the location sharing service again, when there is no remaining time of the sharing time set for the location sharing service; and the controller 210 may share the state information and/or location information of the vehicle depending on the condition set again.

The controller 210 may provide a guide for the extension of the sharing time to the vehicle device 100 when the remaining time of the sharing time set for the location sharing service between the vehicle device 100 and the target service node 300 is less than a reference time while the vehicle is moving.

At this time, the controller 210 may extend the sharing time of the location sharing service, which is being provided currently, based on the feedback information from the vehicle device 100.

In this case, the controller 210 may extend the sharing time of the total target service node 300 of the current location sharing service and may extend the sharing time only for the selected part of the target service node 300.

The operation flow of the location sharing system of the vehicle according to an embodiment of the present disclosure will be described in more detail as follows.

Figure 5:
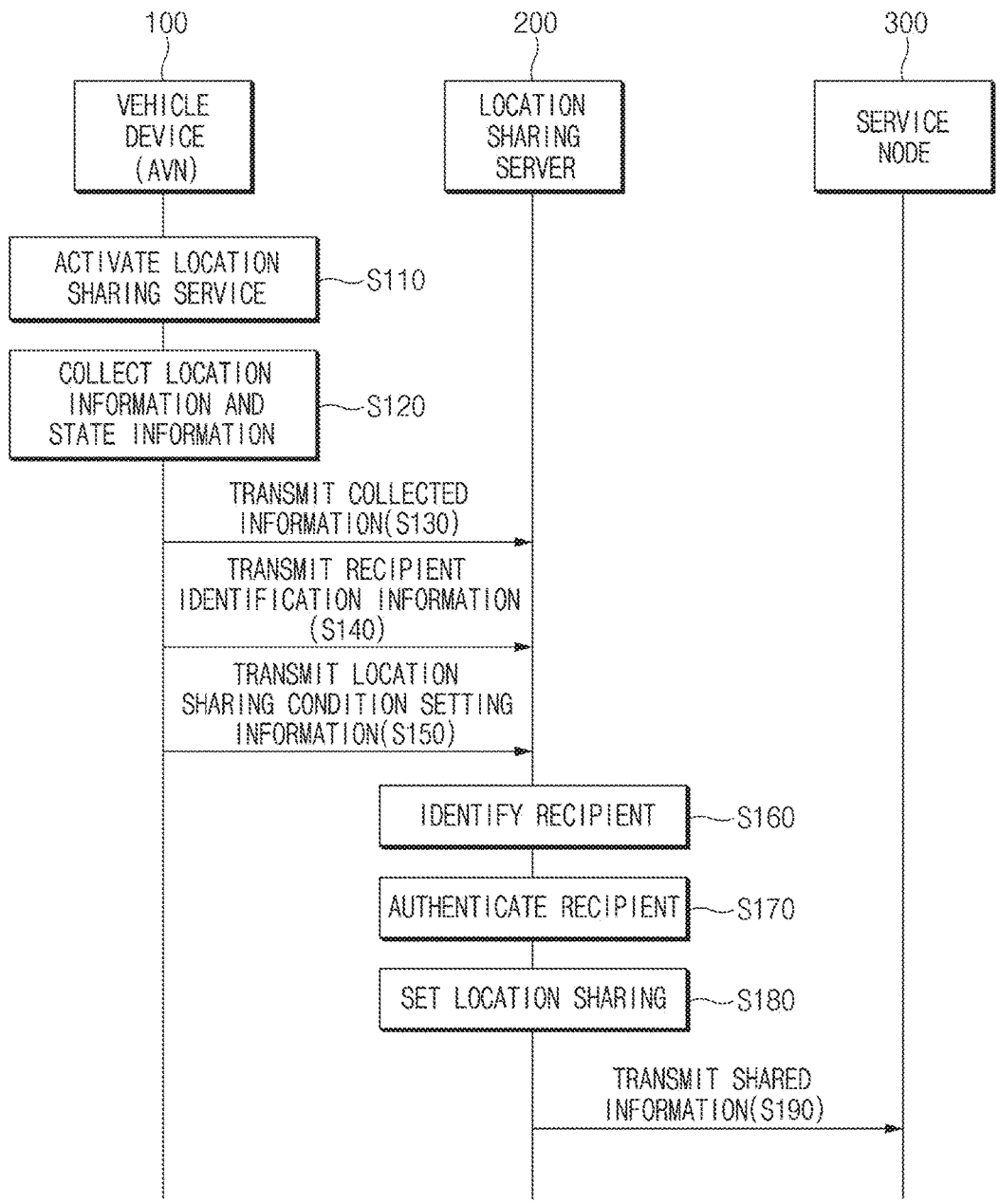
FIG. 5 is a diagram illustrating an operation flow of a location sharing method of a vehicle, according to an embodiment of the present disclosure.

FIG. 5 is a diagram illustrating an operation flow of a location sharing method of a vehicle, according to an embodiment of the present disclosure.

Referring to FIG. 5, in operation S120, the vehicle device 100 collects location information and state information of a vehicle from at least one or more sensors included in the vehicle, when the location sharing service is activated in operation S110.

At this time, in operation S130 to operation S150, the vehicle device 100 transmits recipient identification information and location sharing condition setting information together, while transmitting the information collected in operation S120 to the location sharing server 200.

In operation S160, the location sharing server 200 identifies a recipient for providing a location sharing service based on the recipient identification information received from the vehicle device 100; in operation S170, the location sharing server 200 performs authentication on the recipient.

In operation S170, the location sharing server 200 may perform authentication based on the temporary security code generated based on the identification information of the recipient.

In operation S180, the location sharing server 200 sets location sharing based on the location sharing condition setting information received in operation S150, when the recipient authentication is completed.

In operation S180, the location sharing server 200 may set a sharing target item for providing the location sharing service and the sharing target service node 300 for providing the location sharing service. Furthermore, the location sharing server 200 may set the sharing time for providing the location sharing service.

In operation S190, the location sharing server 200 transmits the shared information of the vehicle device 100, that is, state information and/or location information of a vehicle, to the target service node 300 depending on the condition set in operation S180.

Accordingly, the target service node 300 may provide a recipient with the corresponding service by using the state information and/or the location information of a vehicle received in operation S190.

Operation S140 to operation S180 among operations of FIG. 5 may be skipped when the location information for the already registered location sharing service is shared. In this case, the location sharing server 200 may transmit the state information and/or the location information of a vehicle provided from the vehicle device 100, to the target service node 300 in real time.

Figure 6A:
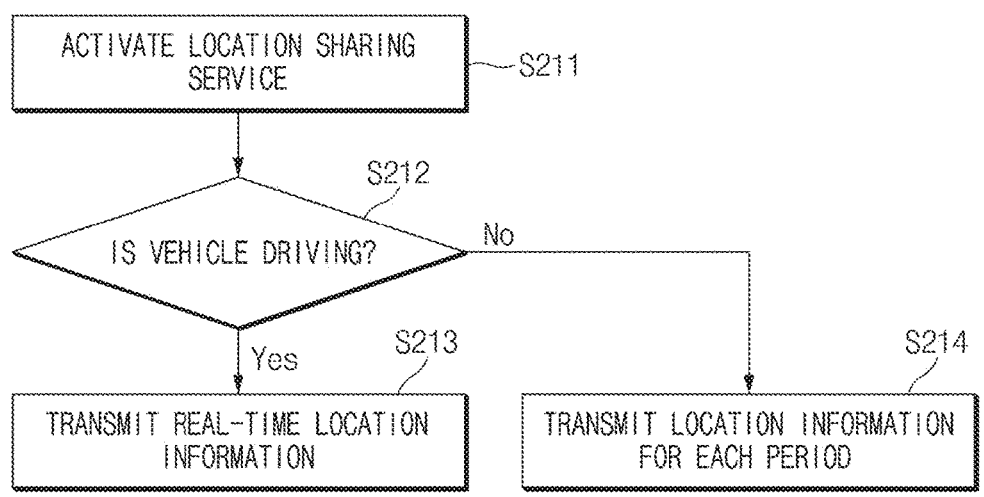
FIGS. 6A, 6B, and 6C are flowcharts illustrating embodiments of an operation of providing location information of a vehicle device, according to an embodiment of the present disclosure.
Figure 6B:
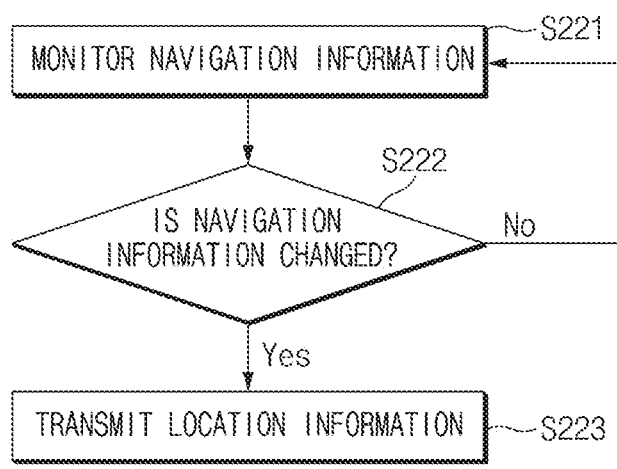
Figure 6C:
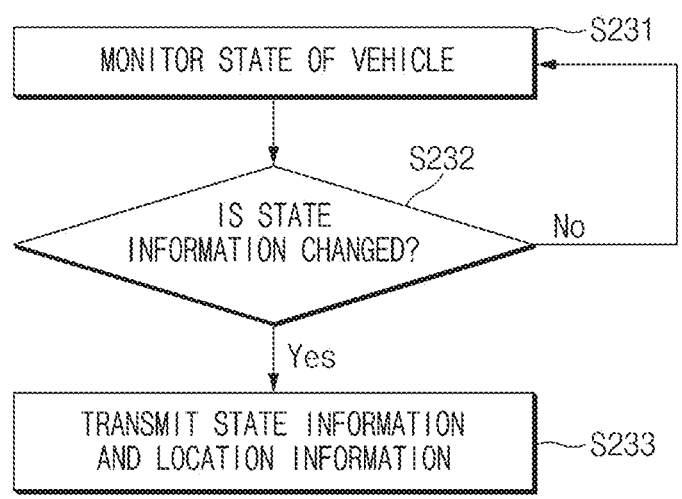

FIGS. 6A to 6C are flowcharts illustrating embodiments of an operation of providing location information of a vehicle device, according to an embodiment of the present disclosure.

Firstly, as illustrated in FIG. 6A, the vehicle device 100 verifies the driving state of a vehicle, when a location sharing service is activated in operation S211. In operation S213, the vehicle device 100 transmits real-time location information of the vehicle collected by a sensor, to the location sharing server 200, when it is determined that the vehicle is driving in operation S212. In operation S214, the vehicle device 100 may transmit location information for each preset period, to the location sharing server 200, when it is determined that the vehicle is not driving in operation S212.

As illustrated in FIG. 6B, in operation S221, the vehicle device 100 monitors navigation information, when the location sharing service is activated. At this time, the vehicle device 100 monitors whether setting information of the navigation device (e.g., a movement route, the remaining movement distance, and/or the remaining movement time) is changed. In addition, the vehicle device 100 monitors whether the current location information of the vehicle verified from the navigation device is changed.

In operation S223, the vehicle device 100 transmits location information based on the changed information of the navigation device, to the location sharing server 200, when the result monitored in operation S221 indicates that navigation information is changed in operation S222.

As illustrated in FIG. 6C, in operation S231, the vehicle device 100 monitors the state of a vehicle, when the location sharing service is activated. At this time, the vehicle device 100 may monitor whether state information of a vehicle (e.g., information about the on/off state of an air conditioning system, specifications, temperature, intensity, an operation mode, the on/off state of an engine, the type of transmission (manual transmission, automatic transmission, and dual clutch transmission) and gear stages (stage P, stage R, stage N, and stage D), the lock/unlock state of a door, an open/closed state, an open/closed state of a hood, an open/closed state of a window, an open/closed state of a sunroof, a heat line state in a steering wheel, a rear window and/or a seat, the charge state of a battery, a charge amount, a charging time, a distance within which a vehicle is capable of driving, the amount of fuel remaining in the vehicle, and a distance within which a vehicle is capable of driving according to the amount of the remaining fuel) is changed.

In operation S233, the vehicle device 100 transmits the changed state information and the changed location information of the vehicle, to the location sharing server 200, when the result monitored in operation S231 indicates that the state information of the vehicle is changed in operation S232.

Accordingly, the location sharing server 200 provides the target service node 300 with the state information and/or the location information of the vehicle, which is received under the condition in at least one of FIGS. 6A, 6B, and 6C, in real time.

Figure 7:
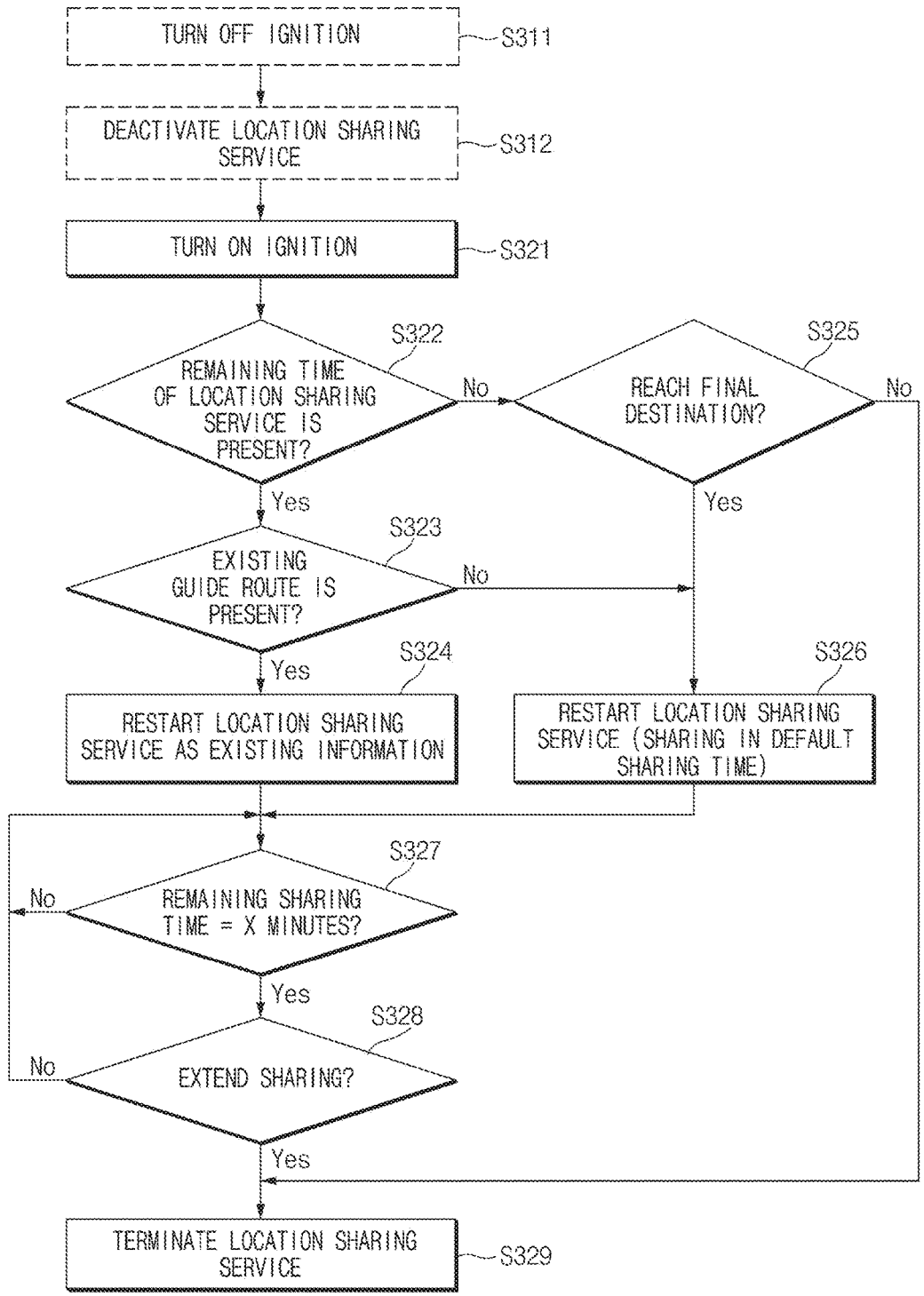
FIG. 7 is a flowchart illustrating an operation of sharing a location when a vehicle restarts, according to an embodiment of the present disclosure.

FIG. 7 is a flowchart illustrating an operation of sharing a location when a vehicle is to restarted, according to an embodiment of the present disclosure.

Referring to FIG. 7, the location sharing server 200 verifies an ignition off state or ignition on state of the vehicle based on the received state information of a vehicle, when the state information and/or the location information from the vehicle device 100 is received through operation S110 to operation S190 in FIG. 5.

In operation S312, the location sharing server 200 may allow a location sharing service to be deactivated, in operation S311, when the ignition off state of the vehicle is verified while a location sharing service is provided. Herein, the setting information of the location sharing service may be maintained during a predetermined time, for example, during a location sharing time.

The location sharing server 200 verifies the remaining time of the sharing time set for the location sharing service between the vehicle device 100 and the target service node 300, in operation S321, when the ignition state of the vehicle is switched to an on state after the location sharing service is deactivated. In operation S324, the location sharing server 200 may restart the location sharing service between the vehicle device 100 and the target service node 300 as the information set before the ignition is turned off, when the remaining time of the sharing time set for the location sharing service is present in operation S322, and when the existing guide route of a navigation device is present in operation S323.

In operation S326, the location sharing server 200 may set the sharing time to a default value again and may restart the location sharing service, when the existing guide route of a navigation device is not present in operation S323 even though the remaining time of the sharing time is present in operation S322.

The location sharing server 200 may determine whether the current location of the vehicle corresponds to the preset final destination, when the remaining time of the sharing time is not present in operation S322. In operation S329, the location sharing server 200 terminates the location sharing service, when it is determined that the current location of the vehicle reaches the final destination in operation S325.

In operation S326, the location sharing server 200 may set the sharing time to a default value again and may restart the location sharing service, when it is determined that the current location of the vehicle does not reach the final destination in operation S325.

The location sharing server 200 may maintain the location sharing service until the remaining time of the sharing time reaches the set reference time (X minutes) while providing the location sharing service, when the location sharing service is restarted by operation S324 or operation S326.

The location sharing server 200 determines whether the location sharing time is extended, when it is determined that the remaining time of the sharing time reaches the reference time (X minutes) in operation S327. The location sharing server 200 may extend the location sharing time and may maintain the location sharing service until the remaining time of the extended sharing time reaches the reference time, when a request for extending the location sharing time is received from a user in operation S328.

In operation S329, the location sharing server 200 may terminate the location sharing service, when it is determined that the location sharing time is not extended any more in operation S328.

Figure 8:
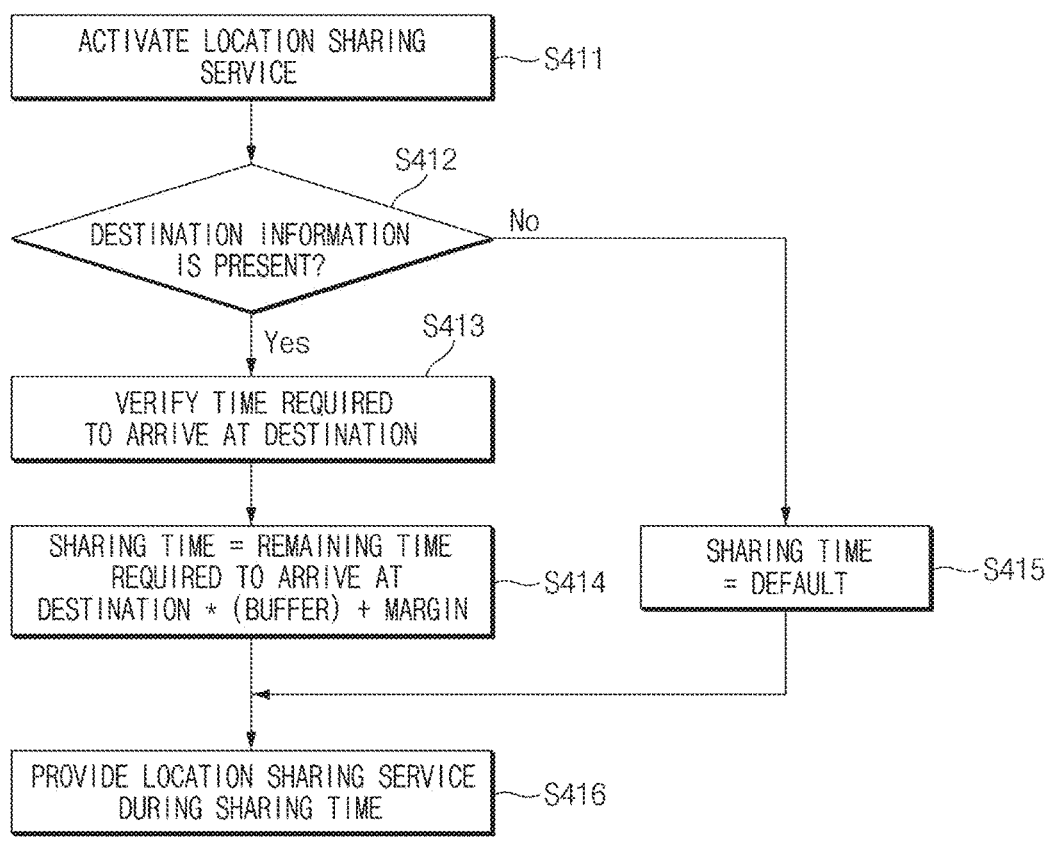
FIG. 8 is a flowchart illustrating an operation of setting a sharing time, according to an embodiment of the present disclosure.

FIG. 8 is a flowchart illustrating an operation of setting a sharing time, according to an embodiment of the present disclosure.

Referring to FIG. 8, the location sharing server 200 determines whether destination information is present in the location information received from the vehicle device 100, when the location sharing service is activated by the vehicle device 100.

In operation S415, the location sharing server 200 may set the sharing time of the corresponding location sharing service to a default value, when the destination information is not present.

In operation S413, the location sharing server 200 verifies a time required to arrive at the destination based on current location information and destination information of a vehicle. In operation S414, the location sharing server 200 sets the sharing time by applying a buffer (e.g., 4/3 times) and a margin (e.g., 10 minutes) to the time required to arrive at the destination verified in operation S413, when it is determined that destination information is present in the location information received from a vehicle in operation S412.

Accordingly, in operation S416, the location sharing server 200 may provide the location sharing service during the sharing time set in operation S414 or operation S415.

The location sharing server 200 may terminate the location sharing service, when the final destination is reached. The location sharing server 200 may extend the sharing time through operations of FIG. 9, when the sharing time set for the location sharing service has elapsed in a state where the vehicle does not reach the final destination.

Figure 9:
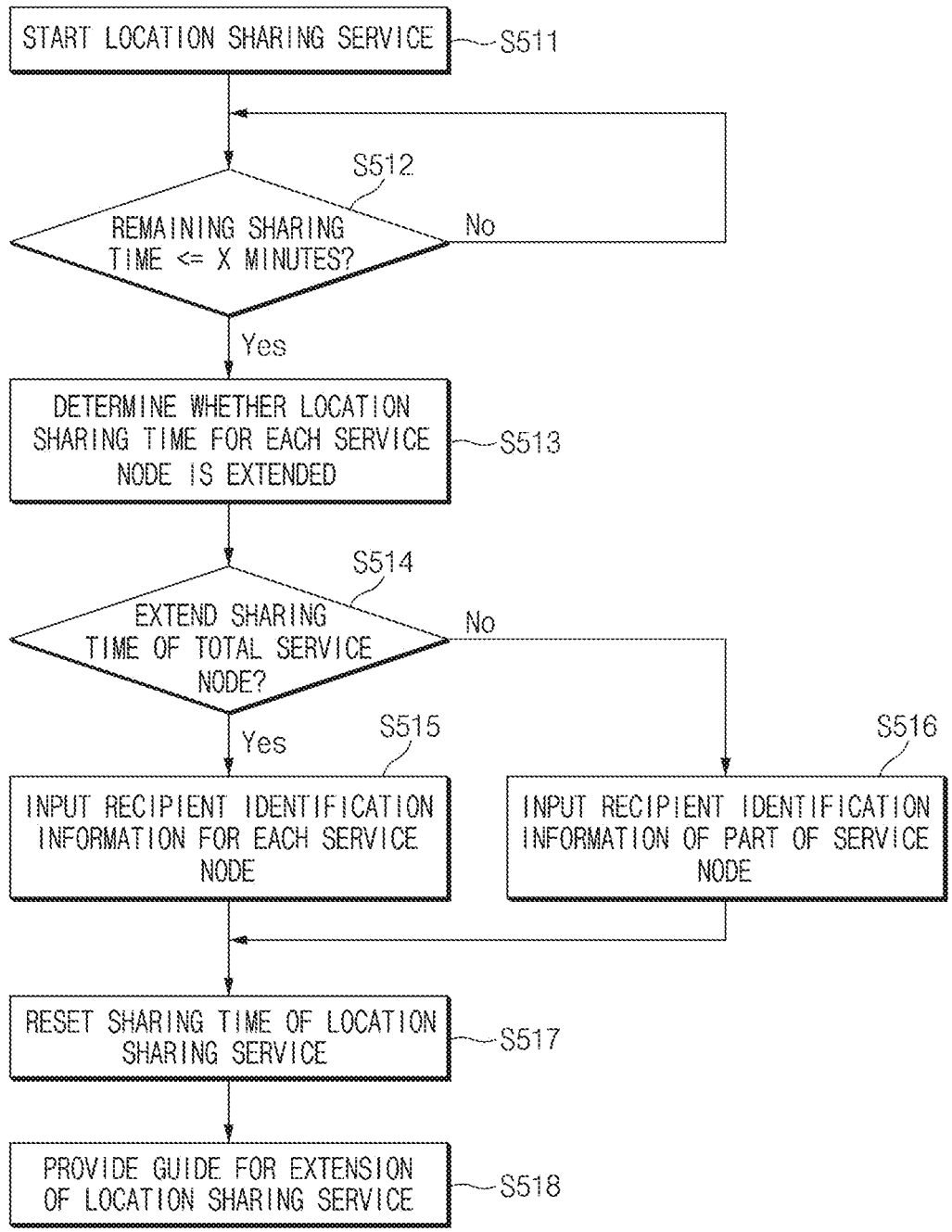
FIG. 9 is a flowchart illustrating an operation of setting a sharing time again, according to an embodiment of the present disclosure.

FIG. 9 is a flowchart illustrating an operation of setting a sharing time again, according to an embodiment of the present disclosure.

Referring to FIG. 9, in operation S511, the location sharing server 200 starts a location sharing service, and the location sharing server 200 verifies the remaining time of the sharing time set for the location sharing service.

At this time, in operation S513, the location sharing server 200 determines whether the location sharing time for each service node 300 is extended, from the vehicle device 100, when the remaining time of the sharing time is within a reference time (e.g., X minutes) in operation S512.

In operation S517, the location sharing server 200 authenticates the recipient by using recipient identification information for each service node 300 and resets the location sharing time, when a sharing time extending request of the total service node 300 together with recipient identification information for each service node 300 is input from the vehicle device 100 in operation S514.

In operation S516, the location sharing server 200 authenticates the recipient by using the recipient identification information of the corresponding service node 300, and, in operation S517, the location sharing server 200 sets the location sharing time of the target service node 300 again, when the sharing time extending request of the corresponding service node 300 together with the recipient identification information of a part of the service node 300 is input from the vehicle device 100.

At this time, in operation S518, the location sharing server 200 may provide a guide for the extension state of the location sharing service, to the vehicle device 100 depending on the location sharing time set again. Herein, the location sharing server 200 may provide a guide for the extension state of the location sharing service to the target service node 300.

Figure 10:
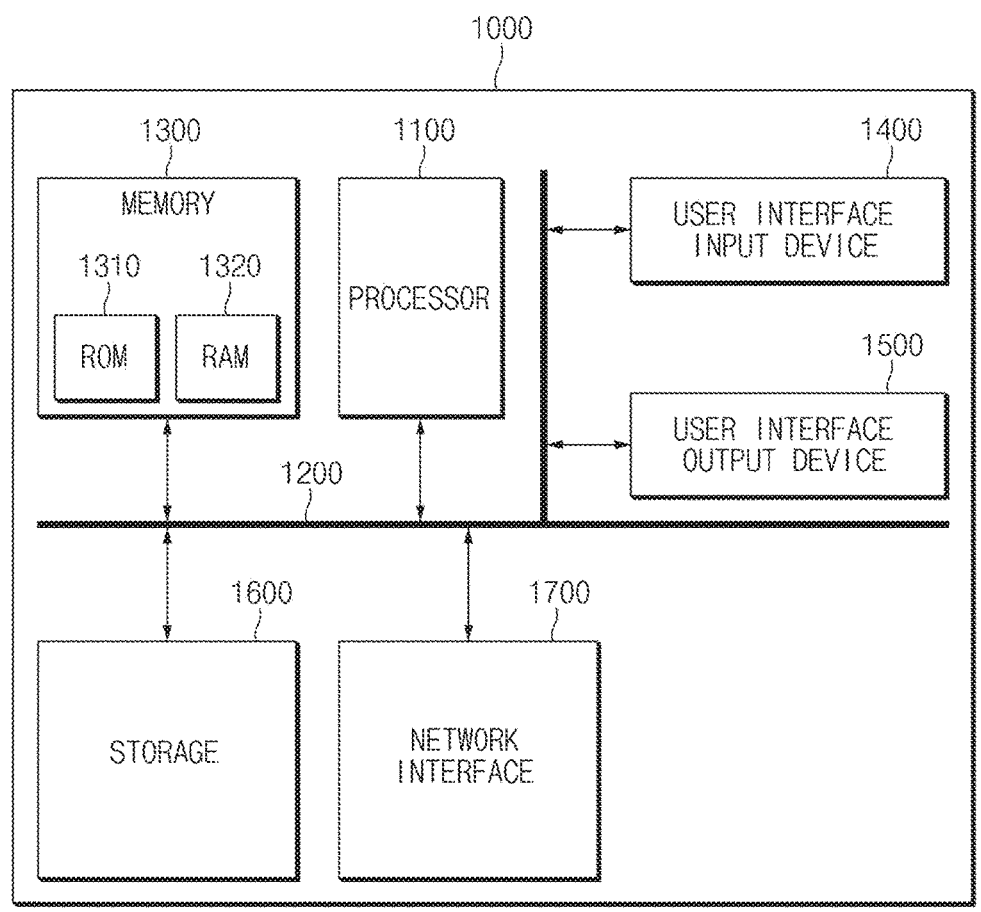
FIG. 10 is a diagram illustrating a computing system performing a method, according to an embodiment of the present disclosure.

FIG. 10 is a diagram illustrating a computing system performing a method, according to an embodiment of the present disclosure.

Referring to FIG. 10, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) 1310 and a random access memory (RAM) 1320.

Thus, the operations of the methods or algorithms described in connection with the embodiments disclosed in the specification may be directly implemented with a hardware module, a software module, or a combination of the hardware module and the software module, which is executed by the processor 1100. The software module may reside on a storage medium (i.e., the memory 1300 and/or the storage 1600) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM). The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may be implemented with separate components in the user terminal.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

According to an embodiment of the present disclosure, it is possible to maintain location sharing setting information between a vehicle device and a target service node at the time of restart after the ignition is turned off and to provide a continuous location sharing service.

Moreover, according to an embodiment of the present disclosure, it is possible to provide a continuous location sharing service by extending the sharing time when the set location sharing time has elapsed while the vehicle is driving.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A location sharing system of a vehicle comprising:
   a vehicle device configured to monitor and provide location information and state information of the vehicle;
   a plurality of service nodes configured to provide a location-based service based on the location information of the vehicle; and
   a location sharing server configured to:
      set a first sharing period of time and a target service node for providing a location sharing service between the vehicle device and the plurality of service nodes;
      transmit the location information of the vehicle to the target service node during the first period of sharing time; and
      determine a remaining period of time in the first period of time for restarting the location sharing service between the vehicle device and the target service node depending on a determination result of the remaining period of time, when a switch from an ignition off state of the vehicle to an ignition on state of the vehicle is determined based on the vehicle state information.

2. The location sharing system of claim 1, wherein the vehicle device is configured to:
   transmit the location information of the vehicle to the location sharing server depending on a driving state of the vehicle in real time or for each period, when the location sharing service is activated upon turning on an ignition of the vehicle.

3. The location sharing system of claim 1, wherein the vehicle device is configured to:
   transmit the location information of the vehicle to the location sharing server, when navigation information, which is monitored by the vehicle device, of the vehicle is changed.

4. The location sharing system of claim 1, wherein the vehicle device is configured to:
   transmit, when the vehicle state information, which is monitored by the vehicle device, is changed, the changed vehicle state information and the location information of the vehicle to the location sharing server.

5. The location sharing system of claim 1, wherein the location sharing server is configured to:
   restart the location sharing service between the vehicle device and the target service node, when the remaining period of time exits in the first sharing period of time.

6. The location sharing system of claim 1, wherein the location sharing server is configured to:
   determine whether a current location of the vehicle corresponds to a destination; and
   determine restart of the location sharing service depending on a determination result of whether the current location corresponds to the destination, when the remaining period of time does not exist in the first sharing period of time.

7. The location sharing system of claim 6, wherein the location sharing server is configured to:
   set a second sharing period of time of the location sharing service to restart the location sharing service based on the second sharing period of time, when the current location of the vehicle does not correspond to the destination.

8. The location sharing system of claim 6, wherein the location sharing server is configured to:
   terminate the location sharing service, when the current location of the vehicle corresponds to the destination.

9. The location sharing system of claim 1, wherein the location sharing server is configured to:
   determine whether to extend the first sharing period of time, through the vehicle device, when the remaining period of time is equal to or smaller than a reference time.

10. The location sharing system of claim 9, wherein the location sharing server is configured to:
    extend the first sharing period of time to be a third sharing period of time for the target service node to provide the location sharing service based on the third sharing period of time, when a request for an extension of the first sharing period of time is received from the vehicle device.

11. The location sharing system of claim 10, wherein the vehicle device is configured to:
    make the request for the extension of the first sharing period of time of all or part of the target service node.

12. The location sharing system of claim 1, wherein the vehicle device is configured to:
    transmit identification information of a recipient and location sharing condition information to the location sharing server to make a request for a registration of the location sharing service.

13. The location sharing system of claim 12, wherein the identification information of the recipient includes at least one or more of vehicle identification number (VIN) of the vehicle device, universal subscriber identity module (USIM) information, a terminal modem serial number, an identify document (ID) and a password of a user, a telephone number, or a security to code arbitrarily generated in advance by the location sharing server.

14. The location sharing system of claim 12, wherein the location sharing condition information includes at least a piece or pieces of information of the target service node for providing the location sharing service, a sharing target item, and share permission.

15. The location sharing system of claim 12, wherein the location sharing server is configured to:

identify the recipient based on the identification information of the recipient to authenticate the identified recipient.

16. The location sharing system of claim 15, wherein the location sharing server is configured to:
set a sharing condition of the location sharing service based on the location sharing condition information, when the authentication of the recipient is completed.

17. The location sharing system of claim 1, wherein the location sharing server is configured to:
determine a period of time required to arrive at a destination from destination information to set the first sharing period of time depending on the determined period of time required to arrive at the destination, when the destination information is included in the location information of the vehicle.

18. A location sharing method of a vehicle, the method comprising steps of:
setting, by a location sharing server, a first sharing period of time and a target service node for providing a location sharing service between a vehicle device, which monitors and provides location information and state information of the vehicle, and a plurality of service nodes, which provide a location-based service based on the location information of the vehicle, to transmit the location information of the vehicle to the target service node during the first sharing period of time;
determining, by the location sharing server, a remaining period of time in the first sharing period of time, when a switch from an ignition off state of the vehicle to an ignition on state of the vehicle is determined based on the vehicle state information; and
restarting the location sharing service between the vehicle device and the target service node, when the remaining period of time exits.

19. The method of claim 18, further comprising steps of:
determining whether a current location of the vehicle corresponds to a destination, when the remaining period of time does not exist;
setting a second sharing period of time of the location sharing service, when the current location of the vehicle does not correspond to the destination; and
restarting the location sharing service based on the second sharing period of time.

20. The method of claim 18, further comprising steps of:
determining whether to extend the first sharing period of time, through the vehicle device, when the remaining period of time is equal to or smaller than a reference time;
extending the first sharing period of time to be a third sharing period of time for the target service node, when a request for extending the first sharing period of time is received from the vehicle device; and
providing the location sharing service based on the third sharing period of time.

* * * * *